(12) United States Patent
Rippstein et al.

(10) Patent No.: US 11,377,603 B2
(45) Date of Patent: Jul. 5, 2022

(54) METHODS OF CO-PROCESSING PETROLEUM DISTILLATES AND BIO-BASED MATERIAL THROUGH A REACTION SERIES

(71) Applicant: ExxonMobil Technology and Engineering Company, Annandale, NJ (US)

(72) Inventors: Ryan A. Rippstein, Conroe, TX (US); Chad A. Perrott, Spring, TX (US); Dean E. Parker, Kingwood, TX (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 17/305,466

(22) Filed: Jul. 8, 2021

(65) Prior Publication Data
US 2022/0025279 A1    Jan. 27, 2022

Related U.S. Application Data

(60) Provisional application No. 63/054,581, filed on Jul. 21, 2020.

(51) Int. Cl.
*C10G 65/12* (2006.01)
*B01J 8/04* (2006.01)
(Continued)

(52) U.S. Cl.
CPC ............... *C10G 65/12* (2013.01); *B01J 8/04* (2013.01); *C10G 45/02* (2013.01); *C10G 45/58* (2013.01);
(Continued)

(58) Field of Classification Search
CPC ........ C10G 65/12; C10G 45/02; C10G 45/58; C10G 47/00; C10G 2300/1011;
(Continued)

(56) References Cited

U.S. PATENT DOCUMENTS

| | | | |
|---|---|---|---|
| 5,215,649 A * | 6/1993 | Grenoble | C10G 47/34 208/48 R |
| 8,729,330 B2 * | 5/2014 | Hanks | C10G 65/04 585/242 |

(Continued)

FOREIGN PATENT DOCUMENTS

WO    WO 03040265    *    5/2003

OTHER PUBLICATIONS

International Search Report and Written Opininion PCT/US2021/070842 dated Sep. 28, 2021.

*Primary Examiner* — Randy Boyer
*Assistant Examiner* — Juan C Valencia
(74) *Attorney, Agent, or Firm* — Robert A. Migliorini

(57) ABSTRACT

Methods of processing bio-based material feed ("bio-feed") and a petroleum feed, using combinations of hydrotreating beds, dewaxing beds, post-treatment beds, and liquid quenching zones. Some methods comprise processing the petroleum feed through first hydrotreating reactor beds; then processing the output with a bio-feed together through second hydrotreating reactor beds; then processing the output through the plurality of dewaxing beds to create a dewaxed stream; and, processing the dewaxed stream through the plurality of post-treatment beds to create a product stream. Other methods comprise processing the petroleum feed through the plurality of first hydrotreating reactor beds; then processing the output through the plurality of dewaxing beds to create a dewaxed stream; and, processing the dewaxed stream and the bio-feed together through the plurality of liquid quenching beds zones to create a
(Continued)

mixed stream; and, processing the mixed stream through the plurality of post-treatment beds to create a product stream.

9 Claims, 2 Drawing Sheets

(51) Int. Cl.
*C10G 45/02* (2006.01)
*C10G 45/58* (2006.01)
*C10G 47/00* (2006.01)

(52) U.S. Cl.
CPC ...... *C10G 47/00* (2013.01); *C10G 2300/1011* (2013.01); *C10G 2300/1037* (2013.01); *C10G 2300/203* (2013.01)

(58) Field of Classification Search
CPC ...... C10G 2300/1037; C10G 2300/203; C10G 3/50; B01J 8/04
See application file for complete search history.

(56) References Cited

U.S. PATENT DOCUMENTS

| | | | |
|---|---|---|---|
| 2013/0152459 A1* | 6/2013 | Banerjee | C10G 49/002 44/385 |
| 2015/0175898 A1 | 6/2015 | McCarthy et al. | |
| 2016/0177201 A1 | 6/2016 | Pandranki et al. | |
| 2017/0175015 A1* | 6/2017 | Podsiadlo | B01J 29/48 |

\* cited by examiner

METHODS OF CO-PROCESSING PETROLEUM DISTILLATES AND BIO-BASED MATERIAL THROUGH A REACTION SERIES

CROSS-REFERENCE TO RELATED APPLICATIONS

This application claims the benefit of U.S. Provisional Application No. 63/054,581, filed on Jul. 21, 2020, the entire contents of which are incorporated herein by reference.

FIELD OF THE INVENTION

This application relates to co-processing a petroleum distillate feed and a bio-based material feed through a hydrotreating reactor comprising a plurality of reactor beds.

BACKGROUND OF THE INVENTION

Petrochemical refining requires a significant capital investment. Designing refinery processes that are efficient and flexible in regards to types of feedstock are important to maximizing revenue and profitability. Product streams of combined petroleum distillates and bio-based materials add to the complexity and cost of processing via additional capital requirements. Minimizing costs (number of reactors and/or reactor sequences) while meeting the process/reaction requirements without sacrificing performance of the existing process configurations (cycle length, product quality, etc.) is important to maintain financial viability.

The standard configuration for co-processing a petroleum distillate feed and a bio-based material feed is to combine the feeds into a whole mixed feed upstream of all the reactors. This presents multiple challenges in at least the first reactor to treat the whole mixed feed. Catalysts must be chosen carefully because of the inherent limitations of processing bio-based materials. Bio-based feed material is generally very high in total acid number (TAN), which requires special equipment considerations, generally including cladding or completely changing the metallurgy of the equipment. Bio-based feed also contains oxygen-containing molecules, which upon reaction with hydrogen at hydrotreating conditions results in a large exotherm per volume reacted. As a result adding bio-based feeds to existing hydrotreating additional quench capacity may be needed. Bio-based feed material may also be high in physical and chemical contaminants that need to be taken into account with catalyst selection. Bio-based feeds when hydrotreated consist mostly of paraffinic hydrocarbons that have high pour points. This leads to cold flow properties in distillate products being off specification in most regions. Consideration is required because of significant changes to pressure drop grading for particulates, activity grading for hydrogen consumption, and heat release compared to that used for 100% fossil-based feeds. Co-processing configuration enhancements necessary to handle the physical and chemical contaminants of the bio-based feed material result in significant additional costs.

SUMMARY OF THE INVENTION

This application relates to co-processing a petroleum distillate feed and a bio-based material feed through a hydrotreating reactor comprising a plurality of reactor beds.

Methods of processing a bio-based material feed ("bio-feed") and a petroleum feed, the method comprising: providing one or more reactors comprising, in series: a plurality of first hydrotreating reactor beds; a plurality of second hydrotreating reactor beds; a plurality of dewaxing beds; and a plurality of post-treatment beds; and processing the petroleum feed through the plurality of first hydrotreating reactor beds to create a first hydrotreated stream; processing the first hydrotreated stream and the bio-feed together through the plurality of second hydrotreating reactor beds to create a second hydrotreated stream; processing the second hydrotreated stream through the plurality of dewaxing beds to create a dewaxed stream; and, processing the dewaxed stream through the plurality of post-treatment beds to create a product stream.

Methods of processing a bio-based material feed ("bio-feed") and a petroleum feed, the method comprising: providing one or more reactors comprising, in series: a plurality of first hydrotreating reactor beds; a plurality of dewaxing beds; a plurality of liquid quenching zones; a plurality of second hydrotreating reactor beds; and a plurality of post-treatment beds; processing the petroleum feed through the plurality of first hydrotreating reactor beds to create a first hydrotreated stream; processing the first hydrotreated stream through the plurality of dewaxing beds to create a dewaxed stream; and, processing the dewaxed stream and the bio-feed together through the plurality of liquid quenching beds zones to create a mixed stream; and, processing the mixed stream through the plurality of post-treatment beds to create a product stream.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION OF THE INVENTION

Figure 1:
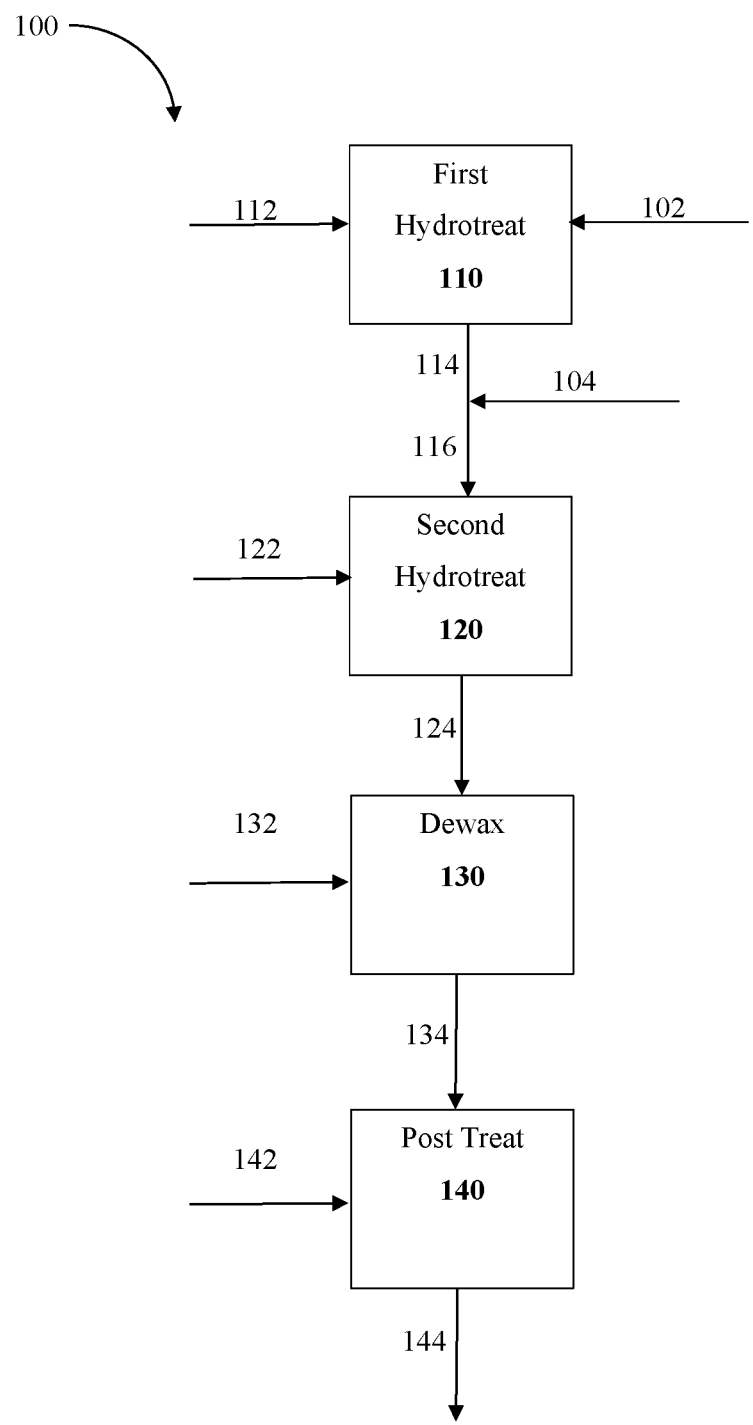
FIG. 1 illustrates an example process flow for hydrotreating a petroleum distillate feed and a bio-feed where the bio-feed is introduced before dewaxing.

This application relates to co-processing a petroleum distillate feed and a bio-based material feed through a hydrotreating reactor comprising a plurality of reactor beds. More specifically, this application is directed to combining the bio-based material feed with the petroleum distillate feed post an initial hydrotreatment of the petroleum distillate feed and then co-processing the combined stream.

Hydrotreating the petroleum distillate feed before combining with the bio-based material feed provides numerous advantages. When modifying existing refinery processes and systems, no modifications are required to existing equipment upstream of the bio-based material feed introduction point. Metallurgical impact to existing equipment is also reduced and, if adding a new reactor, metallurgical impact can be accounted for in the new reactor design.

Mixing the bio-based material feed with a hydrotreated petroleum distillate feed dilutes the bio-based material feed. This dilution reduces, on a per-volume basis, the expected hydrogen consumption and excessive heat of reaction of the bio-based material feed because the hydrotreated petroleum distillate feed is very low reactivity and acts as a diluent and a heatsink. The bio-based material feed TAN is also diluted more effectively by the hydrotreated petroleum distillate.

Introduction of the most reactive oxygen containing bio-feeds last (as in the patent disclosure) amongst all of the dilutions described above also enables a means to drive more exotherm to the combined feed exchange. Combining the feeds via a liquid quench may reduce and/or eliminate the need for a gas vapor quench. Other advantages may be further achieved by the present disclosure.

Definitions and Test Methods

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A," and "B."

As used herein, a reference to a "$C_x$" fraction, stream, portion, feed, or other quantity is defined as a fraction (or other quantity) where 50 vol % or more of the fraction corresponds to hydrocarbons having "x" number of carbons. When a range is specified, such as "$C_x$-$C_y$," 50 vol % or more of the fraction corresponds to hydrocarbons having a number of carbons from "x" to "y." A specification of "$C_{x+}$" (or "$C_{x-}$") corresponds to a fraction where 50 vol % or more of the fraction corresponds to hydrocarbons having the specified number of carbons or more (or the specified number of carbons or less).

The term "$C_n$" hydrocarbon means hydrocarbon having n carbon atom(s) per molecule, wherein n is a positive integer. The term "$C_{n+}$" hydrocarbon means hydrocarbon having at least n carbon atom(s) per molecule, wherein n is a positive integer. The term "$C_{n-}$" hydrocarbon means hydrocarbon having no more than n number of carbon atom(s) per molecule, wherein n is a positive integer. The term "hydrocarbon" means a class of compounds containing hydrogen bound to carbon, and encompasses (i) saturated hydrocarbon, (ii) unsaturated hydrocarbon, and (iii) mixtures of hydrocarbons, including mixtures of hydrocarbon compounds (saturated and/or unsaturated), including mixtures of hydrocarbon compounds having different values of n.

As used herein, "feedstock" and "feed" (and grammatical derivatives thereof) are used interchangeably and both refer to a composition that is fed into a reactor. A feedstock may optionally have been pre-treated to modify its disposition.

The term "reactor," and grammatical derivatives thereof, refers to a vessel comprising one or more catalyst beds.

As used herein, "bio-based material" and "bio-feed" and "bio-feedstock" refers to a feedstock derived from a biological raw material component, such as vegetable fats/oils or animal fats/oils, fish oils, pyrolysis oils, and algae lipids/oils, as well as components of such materials, and in some embodiments can specifically include one or more types of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include C1-C5 alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include C1-C5 alkyl esters.

As used herein, "bio-based material" and "bio-feed" and "bio-feedstock" refers to a material feed where at least 90 vol % of the material feed is derived from a biological source. That is, the bio-feedstock that is processed comprises at least 90 vol % biologically-derived material.

As used herein, the term "petroleum distillate" or "distillate fraction" refers to a conventional (i.e., non-bio-feedstock) hydrocarbon composition typically derived from crude oil that has optionally been subjected to one or more separation and/or refining process and having a true boiling point (ASTM D2887, 2019 revision) of about 35° C. to about 400° C.

As contemplated herein, "dewaxing" refers to a catalytic process that converts long-chain normal paraffins by selective reaction to iso-paraffins or by cracking reaction to shorter-chain aliphatic hydrocarbons. Just as with hydrotreating, while, in general, catalyst-containing base metals, noble metals, zeolite, and/or amorphous silica-alumina are commonly used for petroleum dewaxing, hydrocracking, and/or other selective specialty hydroprocessing reactions, one of skill in the art will be able to choose a suitable catalyst based on process conditions and feed compositions.

When necessary, post-treatment is used to saturate any unsaturated hydrocarbon compounds (olefins and aromatics) formed in the reactors prior to the post-treat layer. These unsaturated hydrocarbon compounds can be generated by unfavorable saturation conditions (reduced pressures and high temperatures), thermal cracking (high temperatures), and/or catalytic cracking (function of the selected catalysts). If not treated, the unsaturates can recombine with other impurities in the liquid and/or vapor within the reactor circuit resulting in the final product not meeting specifications. Generally, post-treatment refers to hydrotreating.

Hydrotreating

The term "hydrotreating" refers to a process by which hydrogen, under pressure, in the presence of a catalyst reacts with sulfur compounds in the fuel to form hydrogen sulfide gas and reacts with nitrogen compounds (to form ammonia gas) and other impurities and a hydrocarbon. As understood by those in the art, the term hydrotreating is used as a general process term descriptive of the reactions in which a prevailing degree of hydrodesulfurization, hydrodenitrogenation and hydrodeoxygenation occurs. Olefins saturation and aromatic saturation take place as well and its degree depends on the catalyst and operating conditions selected.

The hydrogen consumption to feed (petroleum feed plus bio-based feed) ratio in the feed may be from about 1:1 to 25:1. The extent of the desulfurization, denitrogenation, aromatic saturation, and demetalization will depend on the feed sulfur content and, of course, on the product specifications, such as sulfur content, aromatic content (cetane index), gravity (API; specific gravity), distillation/boiling range, nitrogen content, cloud point, pour point, cold filter plugging point (CFPP), etc., with the reaction parameters and catalyst selected accordingly.

Hydrotreating conditions can include temperatures of about 200° C. to about 450° C., or about 315° C. to about 425° C.; pressures of about 250 psig (1.8 MPag) to about 5,000 psig (34.6 MPag) or about 300 psig (2.1 MPag) to about 3,000 psig (20.8 MPag); liquid hourly space velocities (LHSV) of about 0.1 $hr^{-1}$ to about 10 $hr^{-1}$; and hydrogen treat gas rates of about 200 scf/B (35.6 $m^3/m^3$) to about 10,000 scf/B (1,781 $m^3/m^3$), or about 500 (89 $m^3/m^3$) to about 10,000 scf/B (1,781 $m^3/m^3$).

Because the hydrotreatment reactions that take place in this step are exothermic, a rise in temperature takes place along the reactor. The conditions in the hydrodesulfurization step may be adjusted to obtain the desired degree of desulfurization. A temperature rise of about 5° F. to about 200° F. is typical under most hydrotreating conditions and with reactor inlet temperatures in the 400° F. to 800° F. range, with the exact selection dependent on the reaction desired for a given feed and catalyst.

The catalysts used for hydrotreatment can include conventional hydroprocessing catalysts, such as those that comprise at least one Group VIII non-noble metal (Columns 8-10 of IUPAC periodic table), preferably Fe, Co, and/or Ni, such as Co and/or Ni; and at least one Group VIB metal (Column 6 of IUPAC periodic table), preferably Mo and/or W. Such hydroprocessing catalysts can optionally include transition metal sulfides. These metals or mixtures of metals are typically present as oxides or sulfides on refractory metal oxide supports. Suitable metal oxide supports include low acidic oxides such as silica, alumina, titania, silica-titania, and titania-alumina. Suitable aluminas are porous aluminas such as gamma or eta having average pore sizes from 50 to 200 Å, or 75 to 150 Å; a surface area from 100 to 300 $m^2/g$, or 150 to 250 $m^2/g$; and a pore volume from 0.25 to 1.0 $cm^3/g$, or 0.35 to 0.8 $cm^3/g$. The supports are preferably not promoted with a halogen such as fluorine as this generally increases the acidity of the support.

At least one Group VIII non-noble metal, in oxide form, can typically be present in an amount ranging from about 2 wt % to about 40 wt %, preferably from about 4 wt % to about 15 wt %. At least one Group VIB metal, in oxide form, can typically be present in an amount ranging from about 2 wt % to about 70 wt %, preferably for supported catalysts from about 6 wt % to about 40 wt % or from about 10 wt % to about 30 wt %. These weight percentages are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

Alternatively, the hydrotreating catalyst can be a bulk metal catalyst, or a combination of stacked beds of supported and bulk metal catalyst. By bulk metal, it is meant that the catalysts are unsupported wherein the bulk catalyst particles comprise 30-100 wt % of at least one Group VIII non-noble metal and at least one Group VIB metal, based on the total weight of the bulk catalyst particles, calculated as metal oxides and wherein the bulk catalyst particles have a surface area of at least 10 $m^2/g$. It is furthermore preferred that the bulk metal hydrotreating catalysts used herein comprise about 50 to about 100 wt %, and even more preferably about 70 to about 100 wt %, of at least one Group VIII non-noble metal and at least one Group VIB metal, based on the total weight of the particles, calculated as metal oxides.

Bulk catalyst compositions comprising one Group VIII non-noble metal and two Group VIB metals are preferred. It has been found that in this case, the bulk catalyst particles are sintering-resistant. Thus the active surface area of the bulk catalyst particles is maintained during use. The molar ratio of Group VIB to Group VIII non-noble metals ranges generally from 10:1-1:10 and preferably from 3:1-1:3. In the case of a core-shell structured particle, these ratios of course apply to the metals contained in the shell. If more than one Group VIB metal is contained in the bulk catalyst particles, the ratio of the different Group VIB metals is generally not critical. The same holds true when more than one Group VIII non-noble metal is applied. In the case where molybdenum and tungsten are present as Group VIB metals, the molybdenum:tungsten ratio preferably lies in the range of 9:1-1:9. Preferably the Group VIII non-noble metal comprises nickel and/or cobalt. It is further preferred that the Group VIB metal comprises a combination of molybdenum and tungsten. Preferably, combinations of nickel/molybdenum/tungsten and cobalt/molybdenum/tungsten and nickel/cobalt/molybdenum/tungsten are used. These types of precipitates appear to be sinter-resistant. Thus, the active surface area of the precipitate is maintained during use. The metals are preferably present as oxidic compounds of the corresponding metals, or if the catalyst composition has been sulfided, sulfidic compounds of the corresponding metals.

It is also preferred that the bulk metal hydrotreating catalysts used herein have a surface area of at least 50 $m^2/g$ and more preferably of at least 100 $m^2/g$. It is also desired that the pore size distribution of the bulk metal hydrotreating catalysts be approximately the same as the one of conventional hydrotreating catalysts. Bulk metal hydrotreating catalysts have a pore volume of 0.05-5 ml/g, or of 0.1-4 ml/g, or of 0.1-3 ml/g, or of 0.1-2 ml/g determined by nitrogen adsorption. Preferably, pores smaller than 1 nm are not present. The bulk metal hydrotreating catalysts can have a median diameter of at least 100 nm. The bulk metal hydrotreating catalysts can have a median diameter of not more than 5,000 μm, or not more than 3,000 μm. In an embodiment, the median particle diameter lies in the range of 0.1-50 μm and most preferably in the range of 0.5-50 μm.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen containing "treat gas," is provided to the reaction zone. Treat gas, as referred to in this invention, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. The treat gas stream introduced into a reaction stage will preferably contain at least about 50 vol % and more preferably at least about 75 vol % hydrogen.

Composition and Methods

Methods of the present disclosure include mixing (or blending) bio-feed (e.g., a total liquid product from biological sources or a fraction of the total liquid product) with a petroleum distillate. Example combinations of bio-feed and petroleum distillates include, but are not limited to, a bio-feed and a naphtha petroleum distillate; a bio-feed and a gasoline petroleum distillate; a bio-feed and a diesel petroleum distillate; a bio-feed and a kerosene petroleum distillate; and a bio-feed and a vacuum gas oil petroleum distillate; and bio-feed and a cracked petroleum distillate from either FCC, coker, or Flexicoker™; and bio-feed and various distillates listed above along with a cracked petroleum distillate from any of the following sources: FCC, coker, or Flexicoker™ distillates of naphtha to gas oil range boiling components.

The amount of bio-feed (as the total liquid product or a fraction thereof) in a treated stream may be about 1 vol % to about 99 vol %, preferably about 5 vol % to about 70 vol %.

FIG. 1 depicts a process flow 100 for co-processing a petroleum feed ("petroleum feed") 102 and a bio-based material feed ("bio-feed") 104. FIG. 1. depicts a process that avoids problems that could be associated with excessing heat while enabling the use of bio-feed. As shown in FIG. 1, petroleum feed 102 and hydrogen feed 112 is fed into a first hydrotreating reactor 110 that comprises one or more hydrotreating reactor beds. The term "hydrogen feed" can refer to pure hydrogen or a hydrogen-rich stream. A hydrotreated distillate stream 114 exits first hydrotreating reactor 110 enters second hydrotreating reactor 120 along with bio-feed 104. As shown in FIG. 1, the hydrotreated distillate stream 114 and bio-feed 104 are combined into a combined feed 116 to enter second hydrotreating reactor 120, but it will be understood by one of skill in the art that they could easily be fed into second hydrotreating reactor 120 through separate piping.

Second hydrotreating reactor 120 comprises a plurality of hydrotreating reactor beds and receives optional hydrogen feed 122 and combined feed 116. By combining hydrotreated distillate stream 114 and bio-feed 104, the hydrotreated distillate stream 114 acts to help quench the bio-feed 104 as it enters the second hydrotreating reactor. That quench, which lowers the reactivity of the combined feed 116 entering the second hydrotreater, may allow for a higher (e.g. above 20%) percentage of bio-feed as a percentage of the total feed. However, increasing the percentage of bio-feed risks inundating the dewaxing catalyst as the hydrotreating of the bio-feed tends to increase the $CO/CO_2$/water that is released during hydrotreating.

Moreover, in some embodiments, a hydrogen feed 132 can be added to dewaxing bed 130 and/or a hydrogen feed 142 can be added to post treat bed 140 as a quench stream to control temperature in the quenched beds. Hydrogen used as a quench may also act to hydrotreating additive where the temperature is favorable for such a reaction. A second hydrotreated stream 124 exits second hydrotreating reactor 120 and enters a plurality of dewaxing beds 130. A dewaxed stream 134 exits plurality of dewaxing beds 130 and enters a plurality of post-treatment beds 140. The stream exiting plurality of post-treatment beds 140 is a mixed product stream 144.

In some configurations, the first hydrotreating reactor 110, second hydrotreating reactor 120, plurality of dewaxing beds 130, and plurality of post-treatment beds 140, of the process flow 100 may be contained within a single reactor. In other configurations, the process flow 100 may be configured with the first hydrotreating reactor 110 contained in one reactor and the second hydrotreating reactor 120, plurality of dewaxing beds 130, and plurality of post-treatment beds 140 contained within a separate reactor. Optionally, the first hydrotreating reactor 110, second hydrotreating reactor 120, plurality of dewaxing beds 130, and plurality of post-treatment beds 140 are each contained in separate reactor vessels positioned in series to process.

Figure 2:
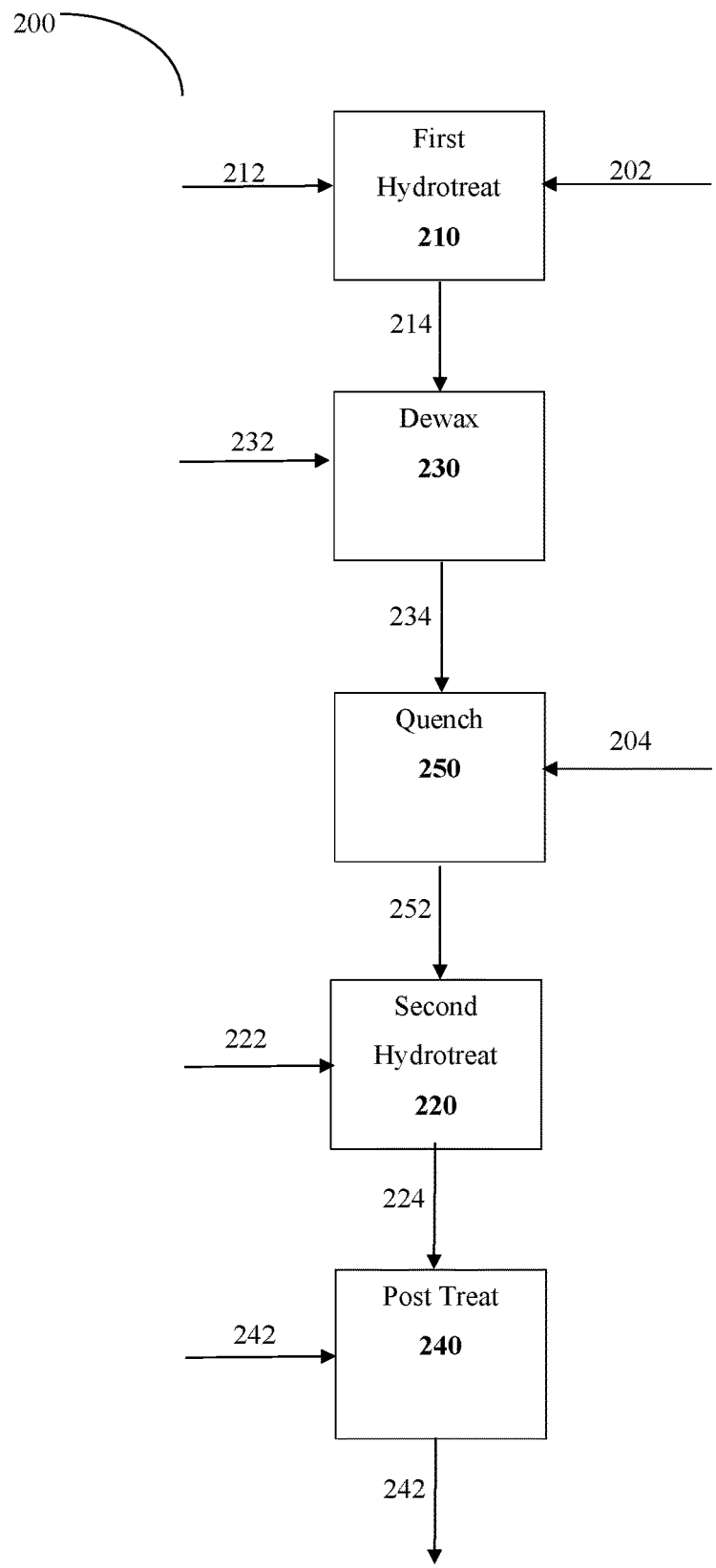
FIG. 2 illustrates another example process flow of hydrotreating a petroleum distillate feed and a bio-feed where the bio-feed is introduced after dewaxing.

FIG. 2 depicts a process flow 200 for co-processing a petroleum distillate feed ("petroleum feed") 202 and a bio-based material feed ("bio-feed") 204. FIG. 2 depicts a process that avoids harming the zeolite catalyst while processing bio-feed where dewaxing is needed. The process includes five stages in series: first hydrotreating 210, dewaxing 230, liquid quenching 250, second hydrotreating 220, and finally post-treating 240. By adding the bio-feed 204 to the process after first hydrotreating 210 and dewaxing 230, the potential for zeolite damage and other dewaxing reaction inhibitions is mitigated. However, as the bio-feed often does need to be treated by dewaxing, adding the bio-feed after the dewaxing step may mean that less (below 20%) bio-feed as a percentage of the total feed can be processed according to FIG. 2.

As shown in FIG. 2, petroleum feed 202 and hydrogen feed 212 is fed into in a first hydrotreating reactor 210 that comprises one or more hydrotreating reactor beds. A hydrotreated distillate stream 214 exits the first hydrotreating reactor 210 enters a plurality of dewaxing beds 230. Moreover, in some embodiments, a hydrogen feed 232 can be added to dewaxing bed 230 and/or a hydrogen feed 242 can be added to post-treat bed 240 as a quench stream to control temperature in the quenched beds. Hydrogen used as a quench may also act to hydrotreating additive where the temperature is favorable for such a reaction. Dewaxed stream 234 exits plurality of dewaxing beds 230 and enters quench system 250 along with a bio-feed liquid 204 that is contacted with dewaxed distillate stream 234 to form quenched stream 252. The liquid quench process provides a number of benefits. It reduces the need for any gas quench, dilutes contaminates in the bio-feed, reduces the hydrogen consumption, per total volume treated as the bio-feed has been diluted, in the first hydrotreating stage 210 since the majority of the feed 202 has already been hydrotreated. This reduction in reactivity in the presence of bio-feed 204 enables exotherm management and potential unit energy savings via placing the highest exotherm near the end to drive the unit heat exchanger system. The dewaxed distillate stream is very low in reactivity after being hydrotreated and dewaxed, and thus it can act as a heat sink for the reactive bio-feed 204.

As noted above, as the percentage of bio-feed to petroleum feed is increased, the efficacy of the process shown in FIG. 2 will decrease. This is due, at least in part, to the fact that as the percentage of bio-feed to petroleum feed is increased, the need to dewax the hydrotreated bio-feed increases. Thus, for higher percentage bio-feed reactions, the process shown in FIG. 1 becomes more appropriate. The point at which the process in FIG. 1 becomes more appropriate will depend on an assessment of the predicted/modeled properties of 1) the mixture of hydrotreated-and-dewaxed petroleum feed and hydrotreated-only bio-feed and resultant reaction products versus 2) the hydrotreated-and-dewaxed mixture of petroleum feed and bio-feed and resultant reaction products such as water and CO. As the percentage of bio-feed to petroleum feed is increased, it may be further desirable to insert additional hydrogen into the plurality of dewaxing beds 230 to maintain appropriate hydrogen availability throughout the process.

As quenched stream 252 exits quench system 250 it enters second hydrotreating reactor 220 along with hydrogen feed 222. After the hydrotreating in second hydrotreating reactor 220, second hydrotreated stream 224 enters a plurality of post-treatment beds 240, wherein post-treatment may involve additional hydrotreating. Post-treated product stream 244 then exits post-treatment beds 240.

In some configurations, the first hydrotreating reactor 210, plurality of dewaxing beds 230, quench system 250, second hydrotreating reactor 220 and post-treatment beds 240 of the process flow 200 may be contained within a single reactor. Optionally, the process flow 200 may be configured with the first hydrotreating reactor 210 contained in a first reactor and the plurality of dewaxing beds 230, quench system 250, second hydrotreating reactor 220 and post-treatment beds 240 combined within a second reactor. Optionally, the first hydrotreating reactor 210 and plurality of dewaxing beds 230 may be contained within a first reactor and the quench system 250, second hydrotreating reactor 220 and post-treatment beds 240 contained within a second reactor. Optionally, the first hydrotreating reactor 210, plurality of dewaxing beds 230, quench system 250, second hydrotreating reactor 220 and post-treatment beds 240 may be configured to each reside in distinct reactor vessels positioned in series.

Example Methods

Methods Described Herein Include Methods A and B:

Method A: A method of processing a bio-based material feed ("bio-feed") and a petroleum feed, the method comprising: providing one or more reactors comprising, in series: a plurality of first hydrotreating reactor beds; a plurality of second hydrotreating reactor beds; a plurality of dewaxing beds; and a plurality of post-treatment beds; and processing the petroleum feed through the plurality of first hydrotreating reactor beds to create a first hydrotreated stream; processing the first hydrotreated stream and the bio-feed together through the plurality of second hydrotreating reactor beds to create a second hydrotreated stream; processing the second hydrotreated stream through the plurality of dewaxing beds to create a dewaxed stream; and, processing the dewaxed stream through the plurality of post-treatment beds to create a product stream.

Method B: A method of processing a bio-based material feed ("bio-feed") and a petroleum feed, the method comprising: providing one or more reactors comprising, in series: a plurality of first hydrotreating reactor beds; a plurality of dewaxing beds; a plurality of liquid quenching zones; a plurality of second hydrotreating reactor beds; and a plurality of post-treatment beds; processing the petroleum feed through the plurality of first hydrotreating reactor beds to create a first hydrotreated stream; processing the first hydrotreated stream through the plurality of dewaxing beds to create a dewaxed stream; and, processing the dewaxed stream and the bio-feed together through the plurality of liquid quenching beds zones to create a mixed stream; and, processing the mixed stream through the plurality of post-treatment beds to create a product stream.

The above method A can be further described with respect to the following elements:

Element 1: wherein first hydrotreating reactor beds and the second hydrotreating reactor beds each receive a hydrogen-rich gas feed.

Element 2: wherein first hydrotreating reactor beds and the second hydrotreating reactor beds each receive a hydrogen-rich gas feed and wherein combining the first hydrotreated stream and the bio-based material within the second hydrotreating reactor beds dilutes the bio-feed within the second hydrotreating reactor and reduces the hydrogen feed to the second hydrotreating reactor beds.

Element 3: wherein combining the first hydrotreated stream and the bio-based material within the second hydrotreating reactor beds reduces the total acid number ("TAN") of the combined feed versus both (i) the TAN of the bio-feed itself or (ii) the TAN of the bio-feed when combined with the petroleum feed.

Element 4: wherein combining the (i) plurality of first hydrotreating reactor beds, (ii) a plurality of second hydrotreating reactor beds, (iii) a plurality of dewaxing beds; and (iv) a plurality of post-treatment beds are combined into a single reactor with the beds in series (i)-(iv).

Element 5: wherein combining the (ii) a plurality of second hydrotreating reactor beds, (iii) a plurality of dewaxing beds; and (iv) a plurality of post-treatment beds are combined into a single reactor while the (i) plurality of first hydrotreated beds is a separate reactor; wherein the beds in are series (i)-(iv).

Element 6: wherein the (i) plurality of first hydrotreating reactor beds, (ii) a plurality of second hydrotreating reactor beds, (iii) a plurality of dewaxing beds; and (iv) a plurality of post-treatment beds are each contained in separate reactors and wherein the beds in are series (i)-(iv).

Element 7: wherein the percent of vol % of the bio-feed is about 20% or more of the volume of the combined total of the bio-feed and the petroleum feed.

Method A can be combined with any of the elements above in any combination. Examples of such combinations include: elements 1 and 3; elements 2 and 3; elements 2 and 4; elements 2 and 5; elements 2 and 6; elements 1, 3, and 7; elements 2, 3, and 7; elements 2, 4, and 7; elements 2, 5, and 7; or elements 2, 6, and 7.

The above method B can be further described with respect to the following elements:

Element 8: wherein first hydrotreating reactor beds and the second hydrotreating reactor beds each receive a hydrogen-rich gas feed.

Element 9: wherein first hydrotreating reactor beds, the second hydrotreating reactor beds, the post-treatment beds, or some combination thereof receive a hydrogen feed and wherein combining the first hydrotreated stream and the bio-based material within the liquid quenching beds dilutes the bio-feed and reduces the hydrogen feed to the second hydrotreating reactor beds.

Element 10: wherein combining the first hydrotreated stream and the bio-based material within the liquid quenching beds reduces the total acid number ("TAN") of the combined feed versus both (i) the TAN of the bio-feed itself or (ii) the TAN of the bio-feed when combined with the petroleum feed.

Element 11: wherein combining the (i) plurality of second hydrotreating reactor beds; (ii) plurality of dewaxing beds; (iii) plurality of liquid quenching beds; (iv) plurality of second hydrotreating reactor beds; and (v) plurality of post-treatment beds are combined into a single reactor with the beds in series (i)-(v).

Element 12: wherein combining the (ii) plurality of dewaxing beds; (iii) plurality of liquid quenching beds; (iv) plurality of second hydrotreating reactor beds; and (v) plurality of post-treatment beds are combined into a single reactor while the (i) plurality of first hydrotreated beds is a separate reactor; wherein the beds are in series (i)-(v).

Element 13: wherein combining the (iii) plurality of liquid quenching beds; (iv) plurality of second hydrotreating reactor beds; and (v) plurality of post-treatment beds are combined into a single reactor and the (i) plurality of first hydrotreated beds and (ii) plurality of dewaxing beds are combined into a second reactor; wherein the beds are in series (i)-(v).

Element 14: wherein the (i) plurality of second hydrotreating reactor beds; (ii) plurality of dewaxing beds; (iii) plurality of liquid quenching beds; (iv) plurality of second hydrotreating reactor beds; and (v) plurality of post-treatment beds are each contained in separate reactors and wherein the beds are in series (i)-(v).

Element 15: wherein the percent of vol % of the bio-feed is about 20% or less of the volume of the combined total of the bio-feed and the petroleum feed.

Method B can be combined with any of the elements above in any combination. Examples of such combinations include: elements 8 and 10; elements 9 and 10; elements 9 and 11; elements 9 and 12; elements 9 and 13; elements 9 and 14; elements 8, 10, and 15; elements 9, 10, and 15; elements 9, 11, and 14; elements 9, 12, and 15; elements 9, 13, and 15; or elements 9, 14, and 15.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Therefore, the present invention is well adapted to attain the ends and advantages mentioned as well as those that are inherent therein.

The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method of processing a bio-based material feed ("bio-feed") and a petroleum feed, the method comprising:
   providing one or more reactors comprising, in series:
      a plurality of first hydrotreating reactor beds;
      a plurality of dewaxing beds;
      a plurality of liquid quenching zones;
      a plurality of second hydrotreating reactor beds; and
      a plurality of post-treatment beds;
   processing the petroleum feed through the plurality of first hydrotreating reactor beds to create a first hydrotreated stream;
   processing the first hydrotreated stream through the plurality of dewaxing beds to create a dewaxed stream; and,
   processing the dewaxed stream and the bio-feed together through the plurality of liquid quenching beds zones to create a mixed stream; and,
   processing the mixed stream through the plurality of post-treatment beds to create a product stream.

2. The method of claim 1 wherein first hydrotreating reactor beds, the second hydrotreating reactor beds, the post treatment beds, or some combination thereof receive a hydrogen feed.

3. The method of claim 2 wherein combining the first hydrotreated stream and the bio-based material within the liquid quenching beds dilutes the bio-feed and reduces the hydrogen feed to the second hydrotreating reactor beds.

4. The method of claim 1 wherein combining the first hydrotreated stream and the bio-based material within the liquid quenching beds reduces the total acid number ("TAN") of the combined feed versus both (i) the TAN of the bio-feed itself or (ii) the TAN of the bio-feed when combined with the petroleum feed.

5. The method of claim 1 wherein combining the (i) plurality of second hydrotreating reactor beds; (ii) plurality of dewaxing beds; (iii) plurality of liquid quenching beds; (iv) plurality of second hydrotreating reactor beds; and (v) plurality of post-treatment beds are combined into a single reactor with the beds in series (i) (v).

6. The method of claim 1 wherein combining the (ii) plurality of dewaxing beds; (iii) plurality of liquid quenching beds; (iv) plurality of second hydrotreating reactor beds; and (v) plurality of post-treatment beds are combined into a single reactor while the (i) plurality of first hydrotreated beds is a separate reactor; wherein the beds are in series (i) (v).

7. The method of claim 1 wherein combining the (iii) plurality of liquid quenching beds; (iv) plurality of second hydrotreating reactor beds; and (v) plurality of post-treatment beds are combined into a single reactor and the (i) plurality of first hydrotreated beds and (ii) plurality of dewaxing beds are combined into a second reactor; wherein the beds are in series (i)-(v).

8. The method of claim 1 wherein the (i) plurality of second hydrotreating reactor beds; (ii) plurality of dewaxing beds; (iii) plurality of liquid quenching beds; (iv) plurality of second hydrotreating reactor beds; and (v) plurality of post-treatment beds are each contained in separate reactors and wherein the beds are in series (i)-(v).

9. The method of claim 1 wherein the percent of vol % of the bio-feed is about 20% or less of the volume of the combined total of the bio-feed and the petroleum feed.

* * * * *